UNITED STATES PATENT OFFICE.

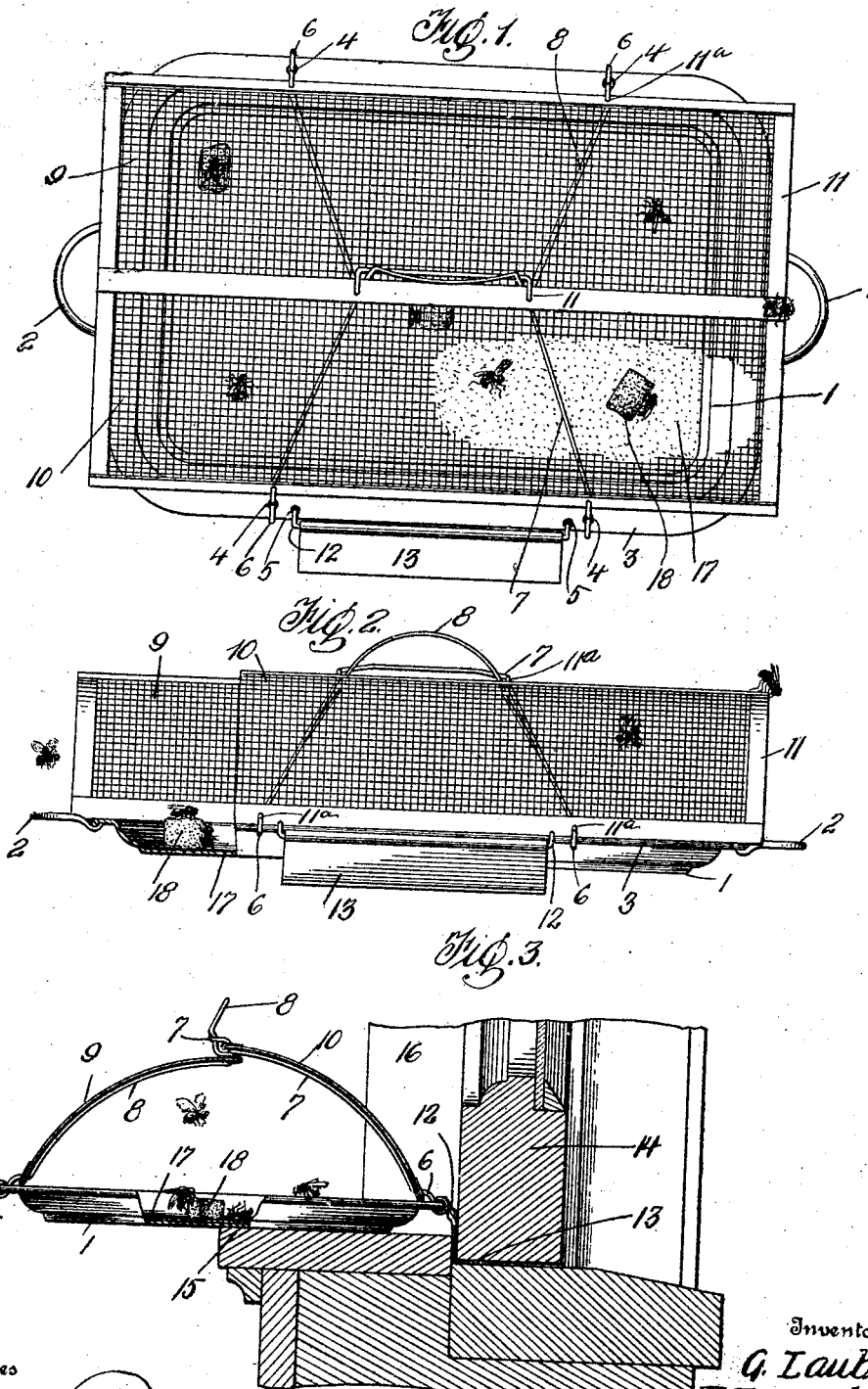

GODFRIED LAUBE AND HATTIE R. LAUBE, OF SANTA MONICA, CALIFORNIA; SAID GODFRIED LAUBE ASSIGNOR TO GEORGE N. BARTLETT, OF LOS ANGELES, CALIFORNIA.

FLY-TRAP.

945,003.　　　　　Specification of Letters Patent.　　Patented Dec. 28, 1909.

Application filed March 6, 1909. Serial No. 481,695.

*To all whom it may concern:*

Be it known that we, GODFRIED LAUBE and HATTIE R. LAUBE, citizens of the United States of America, residing at Santa Monica, in the county of Los Angeles and State of California, have invented certain new and useful Improvements in Fly-Traps, of which the following is a specification, reference being had therein to the accompanying drawing.

This invention relates to a fly trap and the invention has for its object to provide a trap wherein sticky fly paper is used for catching flies, and the trap provided with a screen for rendering the caught flies invisible to persons in the vicinity of the same.

We accomplish the above object by providing a tray that can be used for supporting sticky fly paper or for other purposes by removing the paper and a portion of the trap.

A novel holder is detachably connected to one edge of the tray, whereby said tray can be locked in position upon a window sill, this position of the tray being advantageous whether the same is used as a fly trap or for supporting articles.

The invention will be hereinafter more fully described in detail and then specifically pointed out in the appended claims.

In the drawings, Figure 1 is a plan of the fly trap, Fig. 2 is a side elevation of the same partly broken away and partly in section, and Fig. 3 is an end view of the trap mounted upon a window sill.

In the accompanying drawings, 1 designates a metallic tray having the ends thereof provided with handles 2. The side flanges 3 of the tray are provided with apertures 4 and one of said flanges has a pair of additional apertures 5. Loosely mounted in the apertures 5 are the hook shaped ends 6 of wire frames 7 and 8, these frames being bent to arch the tray 1 and have their upper ends locked, by the end of the frame 8 passing upwardly through the end of the frame 7, as best shown in Fig. 3 of the drawings.

Arranged upon the frames 7 and 8 are curved oblong wire screens 9 and 10 having reinforced edges 11. The screens 9 and 10 are adapted to arch the tray 1, and to secure said screens to the frames 7 and 8, said frames are passed through the longitudinal reinforced edges thereof as at 11$^a$.

Mounted in the aperture 5 is a yoke 12 pivotally supporting an L-shaped holder 13, adapted to be engaged by the lower sash 14 of a window for retaining the tray upon the sill 15 of the window frame 16.

A piece of sticky fly paper 17 is placed upon the tray 1, and suitable bait 18, placed upon the fly paper, whereby flies will be attracted and will enter between the tray and the screens 9 and 10 and be caught by the fly paper or an adhesive substance placed upon the tray 1.

The screens 9 and 10 can be easily removed from the tray 1, and with the tray mounted upon the window sill 15, it can be used as a work tray for holding spools, scissors, etc., or for supporting a flower pot in the sunlight at the window.

As heretofore stated, the screens 9 and 10 prevent the unsightly carcasses of flies or other insects from being observed, besides preventing the garments, window curtains, etc., from contacting with and being damaged by the sticky or adhesive substance carried by the tray.

It is thought that the utility of our trap will be apparent without further description and while we have herein described the preferred embodiments of our invention, we reserve the right to make various changes in the details of construction without departing from the spirit of the invention.

Having now described our invention, what we claim as new is:—

1. In a fly trap, a tray adapted to support an adhesive substance, a yoke carried by one of the longitudinal edges of said tray, an L-shaped holder pivotally connected to said yoke, arch shaped wire frames detachably connected to the longitudinal edges of said tray and adapted to have the upper ends thereof locked together by the end of one frame extending through the end of the other frame, and curved wire screens carried by said frames and arching said tray, substantially as described.

2. In a fly trap, a tray adapted to support an adhesive substance, an L-shaped holder pivotally supported by one of the longitudinal edges of said tray, wire frames detachably connected to the longitudinal edges of said tray and arching said tray, and curved wire screens carried by said frames, the frames being extended through the screens adjacent the longitudinal side edges of the latter and securing the screens to the frames.

In testimony whereof we affix our signatures in the presence of two witnesses.

GODFRIED LAUBE.
HATTIE R. LAUBE.

Witnesses:
BLANCHARD OGDEN,
ALFRED STEERS.